(12) United States Patent
Shirie

(10) Patent No.: US 7,054,073 B2
(45) Date of Patent: May 30, 2006

(54) LENS DEVICE

(75) Inventor: Nobuyuki Shirie, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 10/994,555

(22) Filed: Nov. 23, 2004

(65) Prior Publication Data

US 2005/0111113 A1  May 26, 2005

(30) Foreign Application Priority Data

Nov. 26, 2003  (JP) .............................. 2003-395761

(51) Int. Cl.
  *G02B 15/14* (2006.01)
  *G02B 7/02* (2006.01)
  *G03B 21/14* (2006.01)

(52) U.S. Cl. ...................... 359/699; 359/700; 359/701; 359/819; 359/823; 353/100; 353/101

(58) Field of Classification Search ................ 359/694, 359/699, 700, 701, 819, 822, 823, 824; 353/100, 353/101; 396/533, 544, 16, 143, 207, 439
See application file for complete search history.

(56) References Cited

U.S. PATENT DOCUMENTS

| 3,597,064 | A | * | 8/1971 | Caraway ...................... 352/140 |
| 5,285,322 | A | * | 2/1994 | Horning et al. ............. 359/826 |
| 5,381,272 | A | * | 1/1995 | Kato et al. .................. 359/823 |
| 5,537,262 | A | * | 7/1996 | Aoki et al. .................. 359/822 |
| 5,719,709 | A | * | 2/1998 | Kodaka ....................... 359/694 |
| 5,721,645 | A | * | 2/1998 | Iwasaki et al. ............. 359/823 |
| 6,631,035 | B1 | * | 10/2003 | Iikawa et al. ............... 359/699 |
| 6,643,074 | B1 | * | 11/2003 | Nomura et al. ............. 359/700 |
| 6,778,334 | B1 | * | 8/2004 | Nomura et al. ............. 359/701 |
| 6,819,502 | B1 | * | 11/2004 | Nomura et al. ............. 359/701 |
| 6,853,500 | B1 | * | 2/2005 | Nomura et al. ............. 359/695 |
| 6,906,871 | B1 | * | 6/2005 | Tanaka et al. .............. 359/700 |

* cited by examiner

*Primary Examiner*—Loha Ben
(74) *Attorney, Agent, or Firm*—Arnold International; Bruce Y. Arnold

(57) ABSTRACT

A lens holding barrel is fitted in a fixed barrel in a manner that the lens holding barrel is slidable in optical axis direction. A cam ring is rotatably fitted on outer periphery of the fixed lens. Front regulating members are formed on front end of the fixed barrel, and rear regulating member are formed on rear end of the fixed barrel. Three cutouts are formed on inner surface of the cam ring at even intervals, and cams are formed between these cutouts. Vertical walls are formed at both ends of each cam. The cam ring is fitted onto the fixed barrel after the each front regulating member is faced to the each cutout. After that, the cam ring is positioned between the front regulating member and the rear regulating member by rotation of the cam ring. When the cam ring is rotated in a predetermined range, each cam pushes a cam projection against the biasing of the biasing ring, to move the lens holding barrel in the optical axis direction. If the cam ring is rotated beyond the predetermined range, the cam projection contacts the vertical wall to prevent further rotation of the cam ring. The cam ring cannot be rotated to a position where the front regulation member faces the cutout, after fitted on the fixed barrel.

15 Claims, 9 Drawing Sheets

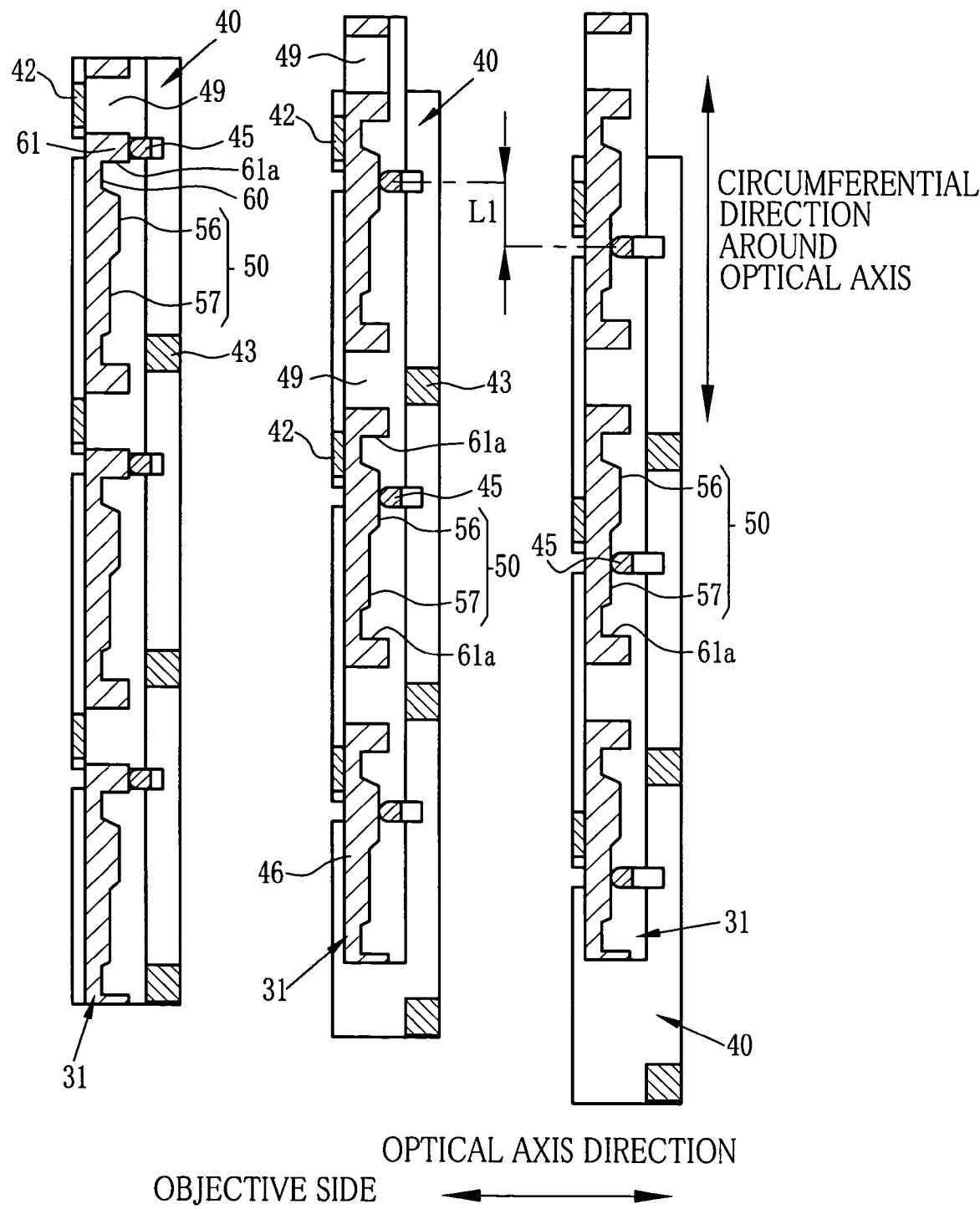

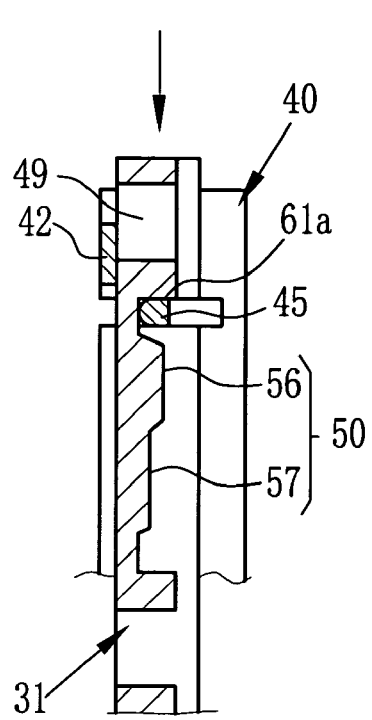
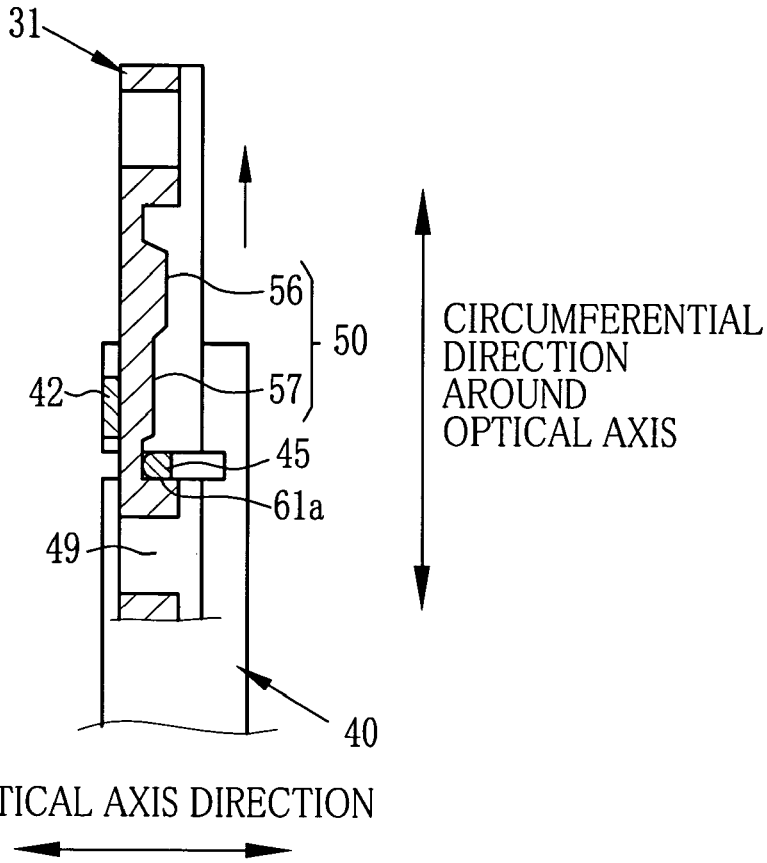
FIG. 6A  FIG. 6B
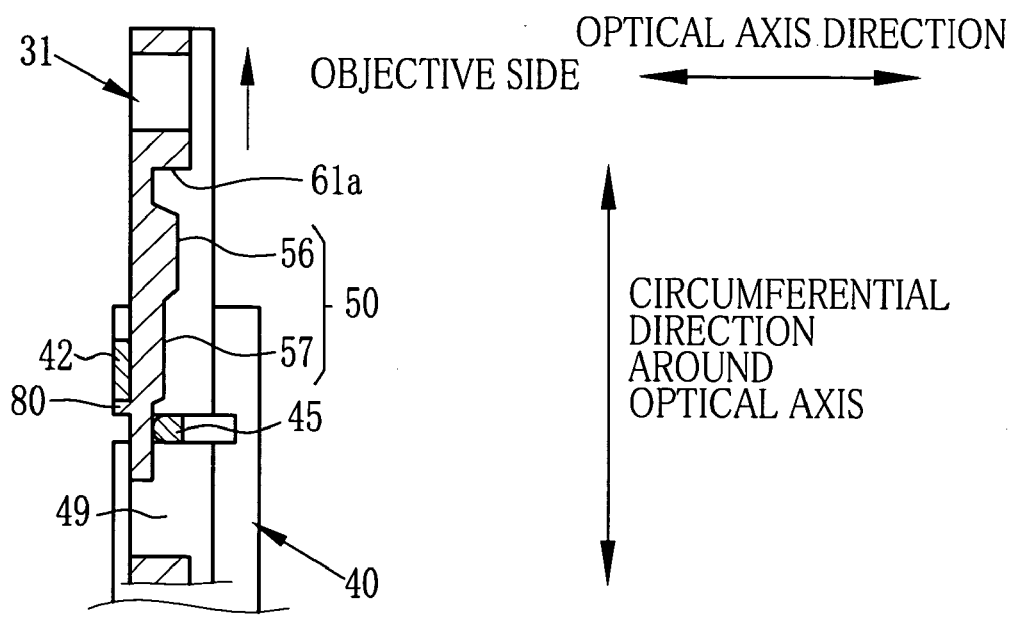
FIG. 7

LENS DEVICE

BACKGROUND OF THE INVENTION

1. Field of the Invention

The present invention relates to a lens device having a lens which moves to predetermined positions in an optical axis direction.

2. Description Related to the Prior Art

Mobile phones having a built-in digital camera are widely used. In the digital camera, there is a type which switches between ordinary photographing and close-up photographing. In a mobile phone 10 shown in FIG. 8, a lid 11 having a liquid crystal display and a main body 12 having a keyboard are folded around a hinge 16 such that the liquid crystal display faces the keyboard. In the lid 11, a camera window 13 is provided on the rear of the liquid crystal display, and a lens device is arranged between the camera window and the liquid crystal display. A slide lever 14 is provided on a side surface of the lid 11, adjacent to the camera window 13. By operating the slide lever 14, a taking lens 15 of the lens device is drawn out toward an objective side to shift to a close-up photographing position from an ordinary photographing position along an optical axis 15a.

As shown in FIG. 9 and FIG. 10, a conventional lens device 17 is constituted of a lens holding frame 18, a cam ring 19, a fixed frame 20, an infrared ray cutting filter 21 and a light shielding frame 22, sequentially in this order from the objective side. A Charge Coupled Device (CCD) is fixed at the rear of the light shielding frame 22. The lens holding frame 18 holds the taking lens 15, which is a fixed focal length lens.

On the rear of the cam ring 19, a cam surface 23 is formed along its circumferential direction. The cam surface 23 contacts a cam pin 24 provided on the fixed frame 20, from the direction of the optical axis 15a. The cam ring 19 is rotatably arranged between a fixed barrel 20a and the lens holding frame 18 which are arranged along the direction of the optical axis 15a. In addition, the cam surface 23 is biased to contact the cam pin 24 by a tension springs 25 which pulls the lens holding frame 18 to the fixed frame 20. A projection 26 is provided on outer periphery of the cam ring 19. The projection 26 is connected to the slide lever 14, accordingly the cam ring 19 is rotated at predetermined angle to move the lens holding plate 18 along the optical axis 15a by operation of the slide lever 14. Projection rods 27 which protrude toward the objective side are provided on each of four corners of outer periphery of the fixed frame 20. These projection rods 27 stop the rotation of the lens holding frame 18 by contacting with a hook 28 of the lens holding plate 18. And spaces between the projection rods 27 house the tension springs 25.

To house the lens device 17 in small mobile devices like the mobile phone, there is a need to use the fixed focal length lens for simplifying a focus adjustment mechanism, so that the mobile phone becomes more compact and reduces its cost. Especially, there is a need to reduce the thickness of the lens device in the direction of the optical axis 15a, because the optical axis of the taking lens is perpendicular to display plane or operation plane of the mobile phone. However, the lens device 17 stated above, has large length in direction of the optical axis 15a, because the fixed frame 20, the cam ring 19, and the lens holding frame 18 are overlapped along the optical axis 15a. And the diameter of the lens device 17 becomes larger by providing the space for the tension spring 25. Further, the lens device has low assembling efficiency because there is a need to hang the spring 25 in assembling.

In addition, the spring 25 is sometimes unhooked by a hard impact or the like to cause malfunction.

SUMMARY OF THE INVENTION

A main object of the present invention is to provide a lens device which is compact.

Another object of the present invention is to provide a lens device which is easy to be assembled and hardly causes malfunction even if it receives an impact.

In order to achieve the object and the other object, the lens device of the present invention includes a lens holding frame for holding a lens, cam projections projecting from outer periphery of the lens holding frame, a fixed barrel containing the lens holding frame movably in a direction of an optical axis of the lens, a cam ring rotatably held on outer periphery of the fixed barrel, cams provided on the cam ring, and a biasing member biasing the cam projection toward the cam.

For putting the cam ring rotatably on the fixed barrel in a manner that the cam ring cannot move in an optical axis direction, front regulating members and rear regulating members are provided on front and rear of the outer periphery of the fixed barrel respectively. In this case, the front regulating members interrupt the cam ring entering the outer periphery of the fixed barrel. To prevent this, cutouts as the passage for the front regulating members in optical axis direction are provided on the cam ring. When the cam ring is rotated around the outer periphery of the fixed barrel, the cutouts reach an attaching and detaching position where the cutouts and the front regulating members face each other. In this case, the cam ring is pushed out from the fixed barrel by biasing force of the biasing member. In consideration of this, a rotation regulating member for regulating rotation of the cam ring is provided to prevent that the rotation of the cam ring reaches to the attaching and detaching position. Note that a biasing ring provided around the outer periphery of the fixed barrel is used as the biasing member, accordingly the lens device becomes compact because of small space for a spring.

Walls (projections) are formed on both ends along circumferential direction of the cam. The walls prevent rotation of the cam projection. Instead of the one of two walls, a projection projected along the optical axis direction from front end of the cam ring may be provided. The projection contacts to the front regulating member to stop the rotation of the cam ring.

According to the present invention, the lens device becomes compact in the optical axis direction because the lens holding frame is contained in the fixed barrel, and the cam ring is put on the outer periphery of the fixed barrel. If a biasing ring provided around the outer periphery of the fixed barrel is used as the biasing member to bias the cam projection to the cam, the lens device becomes compact because the biasing ring needs smaller space compared with the conventional tension spring. Further, because the rotation of the cam ring is not reached to the attaching and detaching position after the cam ring is put on the fixed barrel, the cam ring is not dropped off from the fixed barrel when the cam ring rotates. In addition, because the wall is provided on the cam to regulate the rotation of the cam ring, the structure becomes simple and compact.

BRIEF DESCRIPTION OF THE DRAWINGS

The above objects and advantages of the present invention will become easily understood by one of ordinary skill in the art when the following detailed description would be read in connection with the accompanying drawings.

FIG. 5 is a development of the inner periphery of the cam ring and the outer periphery of the fixed barrel, FIG. 5A shows a state that the cam ring is attached to the fixed barrel at an attaching and detaching position, FIG. 5B shows a state that the cam ring is rotated to an ordinary photographing position after attached to the fixed barrel, and FIG. 5C shows a state that the cam ring is rotated to a close-up photographing position;

FIG. 6 is a schematic diagram showing a state that the cam ring of FIG. 5 is rotated beyond a range for photographing, FIG. 6A shows a state of regulating downward movement of the cam ring, and FIG. 6B shows a state of regulating upward movement of the cam ring;

FIG. 7 is a schematic diagram illustrating another embodiment of the rotation regulating member;

PREFERRED EMBODIMENTS OF THE INVENTION

Figure 1:
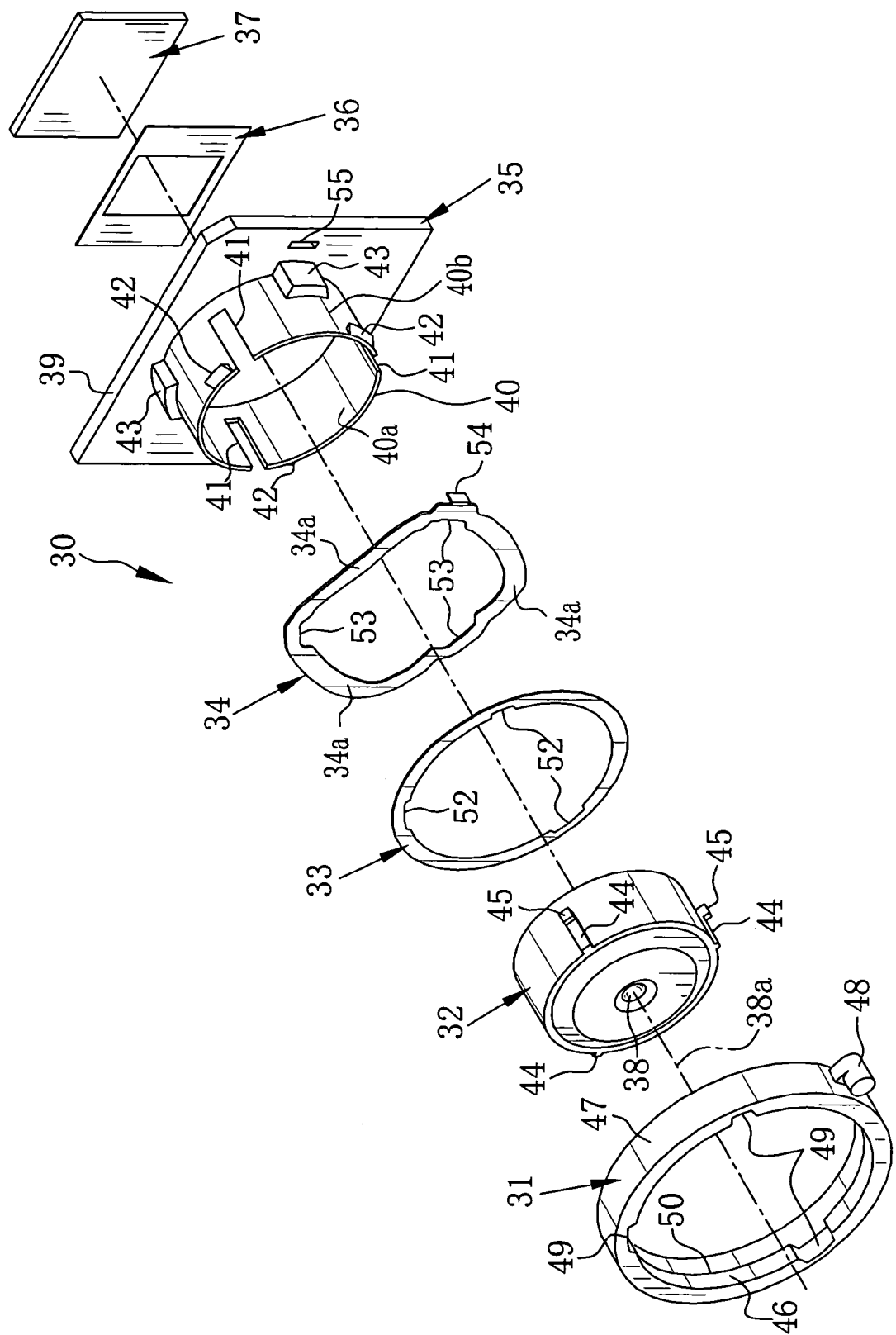
FIG. 1 is an exploded perspective view illustrating a lens device of the present invention.
Figure 2:
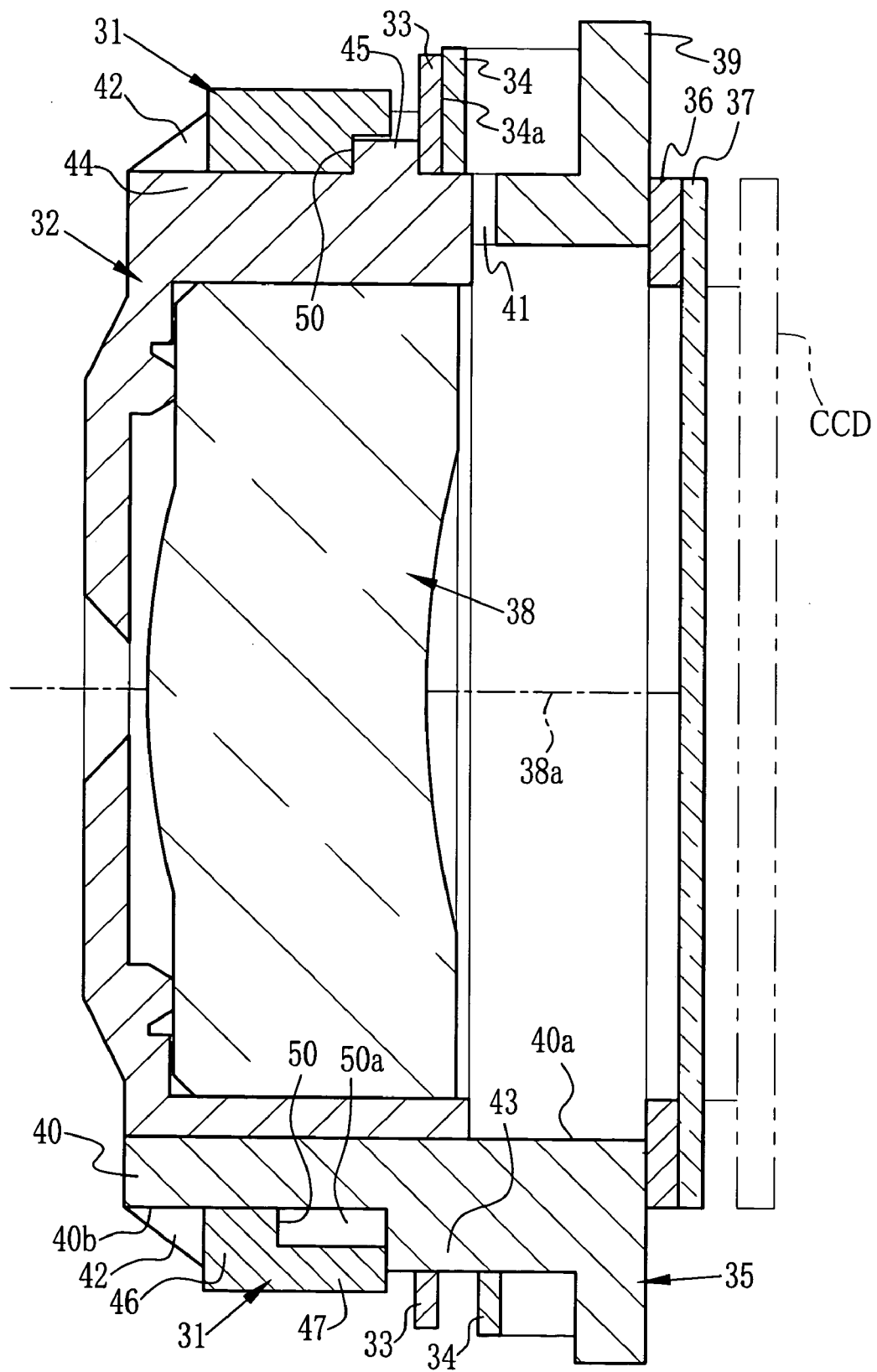
FIG. 2 is a sectional view of the lens device of FIG. 1, in which a cam ring is at an ordinary photographing position.
Figure 3:
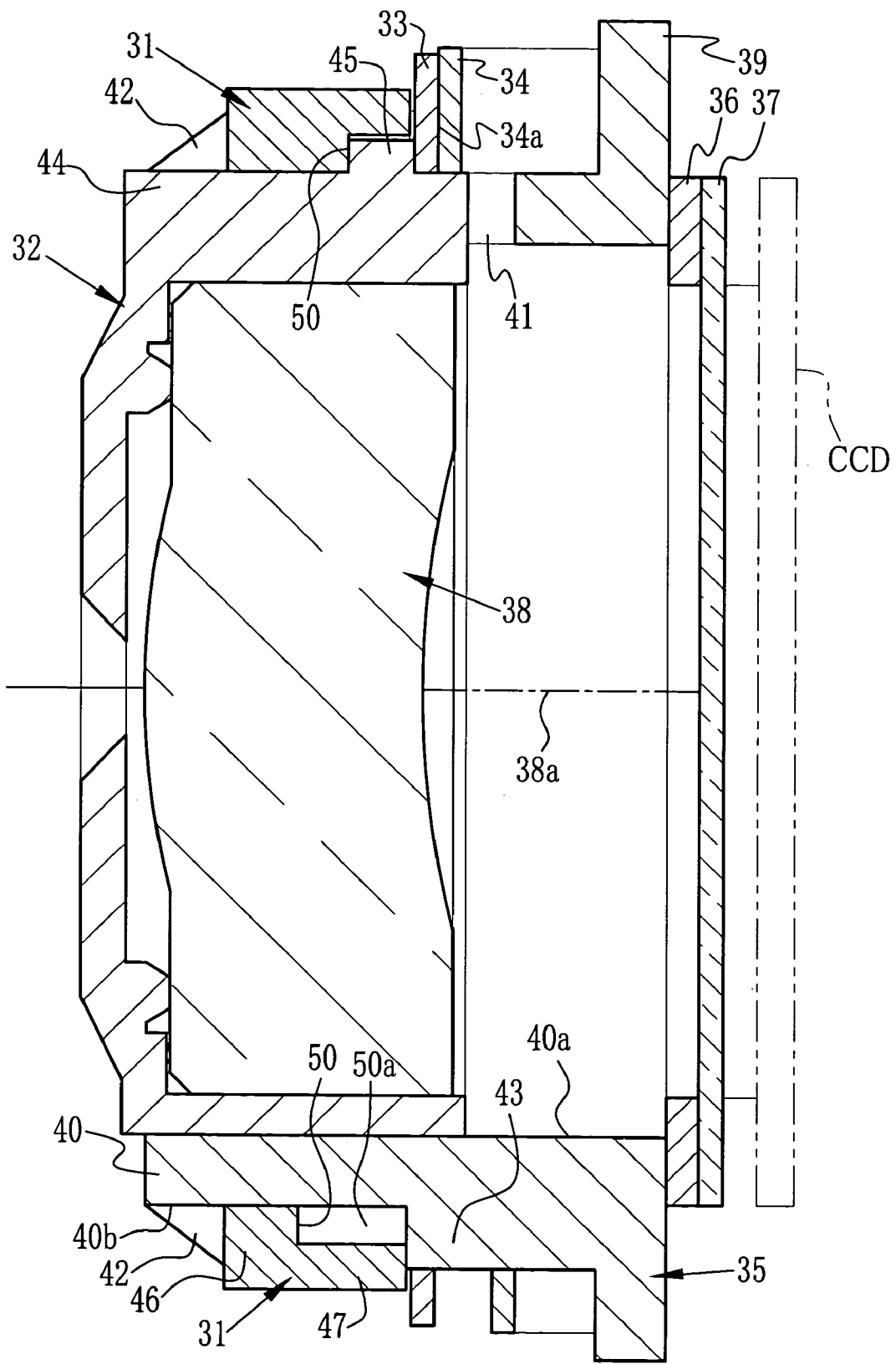
FIG. 3 is a sectional view of the lens device of FIG. 1, in which the cam ring is at a close-up photographing position.

As shown in FIG. 1 to FIG. 3, a lens device 30 of the present invention is constituted of a cam ring 31, a lens holding frame 32, a spacer ring 33, a biasing ring 34, a fixed frame 35, a light shielding frame 36, and an infrared ray cutting filter 37, sequentially in this order from an objective side. A CCD sensor is fixed at rear of the infrared ray cutting filter 37. The lens holding frame 32 holds a fixed focal length lens 38.

The fixed frame 35 is an integration of a fixed barrel 40 and a flange 39 which is in form of a plate protruding from outer periphery of rear end of the fixed barrel 40. The fixed barrel 40 projects forwardly from the flange 39. The lens holding frame 32 is held in an inner periphery 40a, and the cam ring 31 is put on an outer periphery 40b.

On the fixed barrel 40, three guide openings 41 are provided at even intervals for holding the lens holding frame 32 in slidable manner in a direction of an optical axis 38a. The guide openings 41 are straight-line cutouts extending in the direction of the optical axis 38a from the front end of the fixed barrel 40. Three front regulating members 42 and three rear regulating members 43 are provided on the front side and the rear side of the outer periphery 40b respectively at even intervals. Note that the guide openings 41, the front regulating members 42 and the rear regulating members 43 are shifted with each other in circumference direction of the fixed barrel 40 such that these members are not overlapped in the optical axis direction. Number of these members is not limited to three, and may be two or four, for example.

Three guide projections 44 are provided on outer periphery of the lens holding frame 32, for engaging with the three guide openings 41. These guide projections 44 have a height not to project from the outer periphery 40b when the lens holding frame 32 is fitted into the fixed barrel 40. The cam projections 45 project from the rear end of the each guide projection 44. These cam projections have a height to project from the outer periphery 40b, through the guide openings 41.

The cam ring 31 is an annular member with an L-shaped cross section which is constituted of a sleeve 47 and a ring 46 provided on a front end of an inner surface of the sleeve 47. A projection 48 for connecting with a slide lever of a mobile phone is provided on outer periphery of the sleeve 47.

Three cutouts 49 are provided on the ring 46. These cutouts 49 are the passage for the front regulating member 42. The rear end of the sleeve 47 contacts the front end of the rear regulating member 43 when the cam ring 31 is fitted onto the fixed barrel 40 with the three cutouts 49 facing the three front regulating members 42 respectively. An interval between the front regulating member 42 and the rear regulating member 43 in the direction of the optical axis 38a corresponds to the width of the cam ring 31. Accordingly, even if the cam ring 31 is rotated around the circumference direction after being fitted onto the fixed barrel 40, the cam ring 31 cannot come away from the fixed ring 40, because the front regulating member 42 is positioned in front of the ring 46. Therefore, the cam ring 31 is rotatably held by the fixed barrel 40 in a manner that the cam ring 31 cannot move in the direction of the optical axis 38a. The cam ring 31 can rotate within a predetermined angle up to 120 degrees.

A cam 50 is formed on the rear surface of the ring 46, for moving the lens holding frame 32 in the direction of the optical axis 38a. The cam projection 45 enters a gap 50a between the sleeve 47 and the fixed barrel 40, and contacts to the cam 50.

The spacer ring 33 and the biasing ring 34 are overlapped and positioned on the fixed barrel 40, between the flange 39 and the cam projection 45, as openings 52, 53 formed on inner periphery of the spacer ring 33 and the biasing ring 34 respectively allow the rear regulating members 43 to pass through them.

The biasing ring 34 is a resiliently deformable thin ring which undulates to form protruding portion 34a protruding toward the objective side. Each of the protruding portion 34a positions between the openings 53. Protruding length of the protruding portion 34a corresponds to a distance between a position to contact with the front surface of the flange 39 and a position to push the cam projection 45 toward the cam 50 through the spacer ring 33. A hook 54 projecting rearward is provided on the biasing ring 34 so that the protruding portions 34a are positioned at the back of the each cain projection 45. The hook 54 is engaged with a hole 55 provided on the flange 39, to prevent that the opening 53 comes away from the rear regulating member 43 when the biasing ring 34 deforms. Note that annularly biasing member formed of sponge or rubber which has resiliency in the optical axis direction may be used as the biasing ring 34. In addition, biasing members which are not annular, for example plural resilient members like sponges or rubbers having circular cross-sectional or rectangular shape, or plural compression springs and so on, may be provided to face the back of the each cam projection 45.

Figure 4:
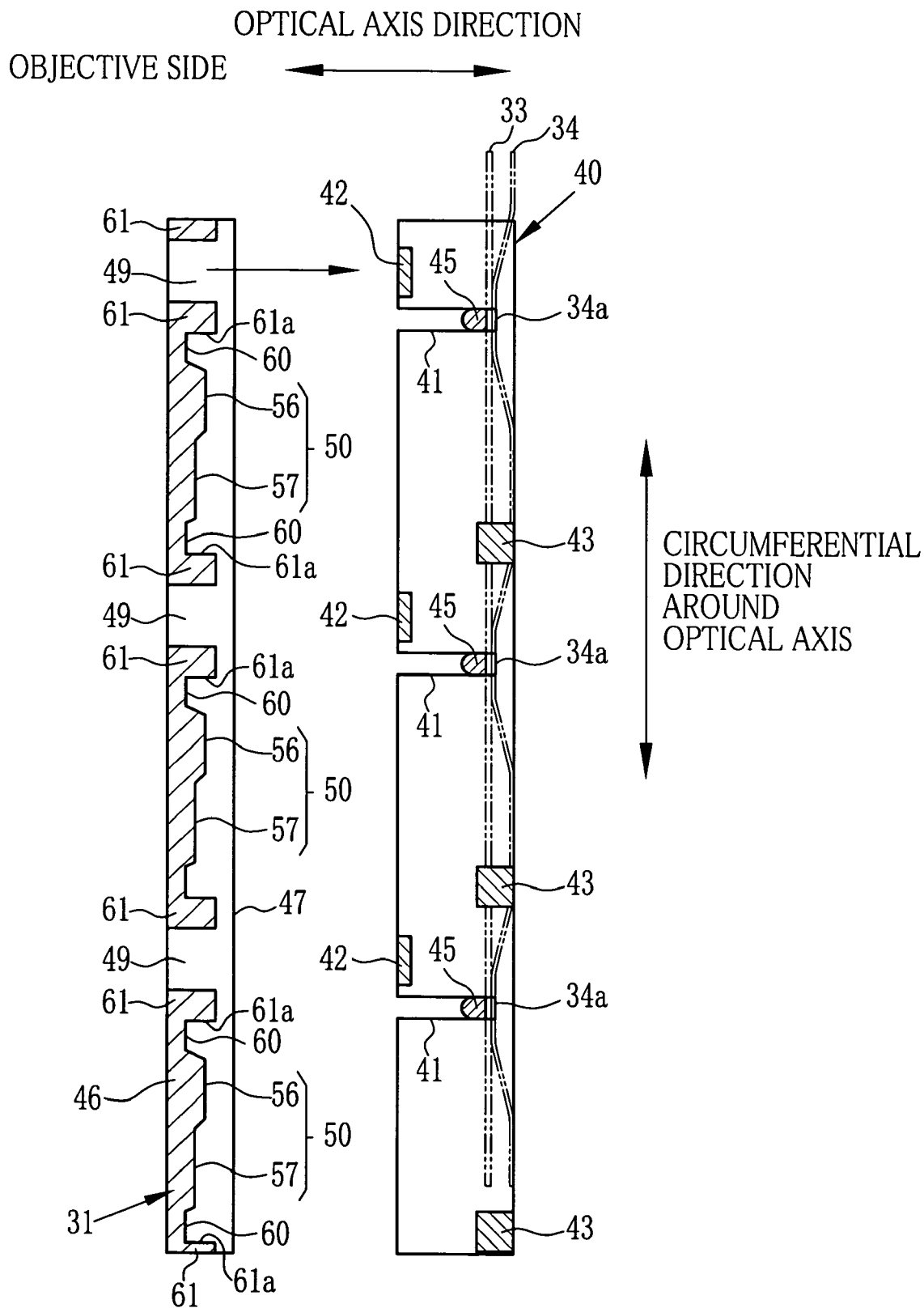
FIG. 4 is a development of inner periphery of the cam ring and outer periphery of a fixed barrel, which shows relative position of the cam ring and the fixed barrel before the cam ring is inserted onto the fixed barrel.
Figure 8:
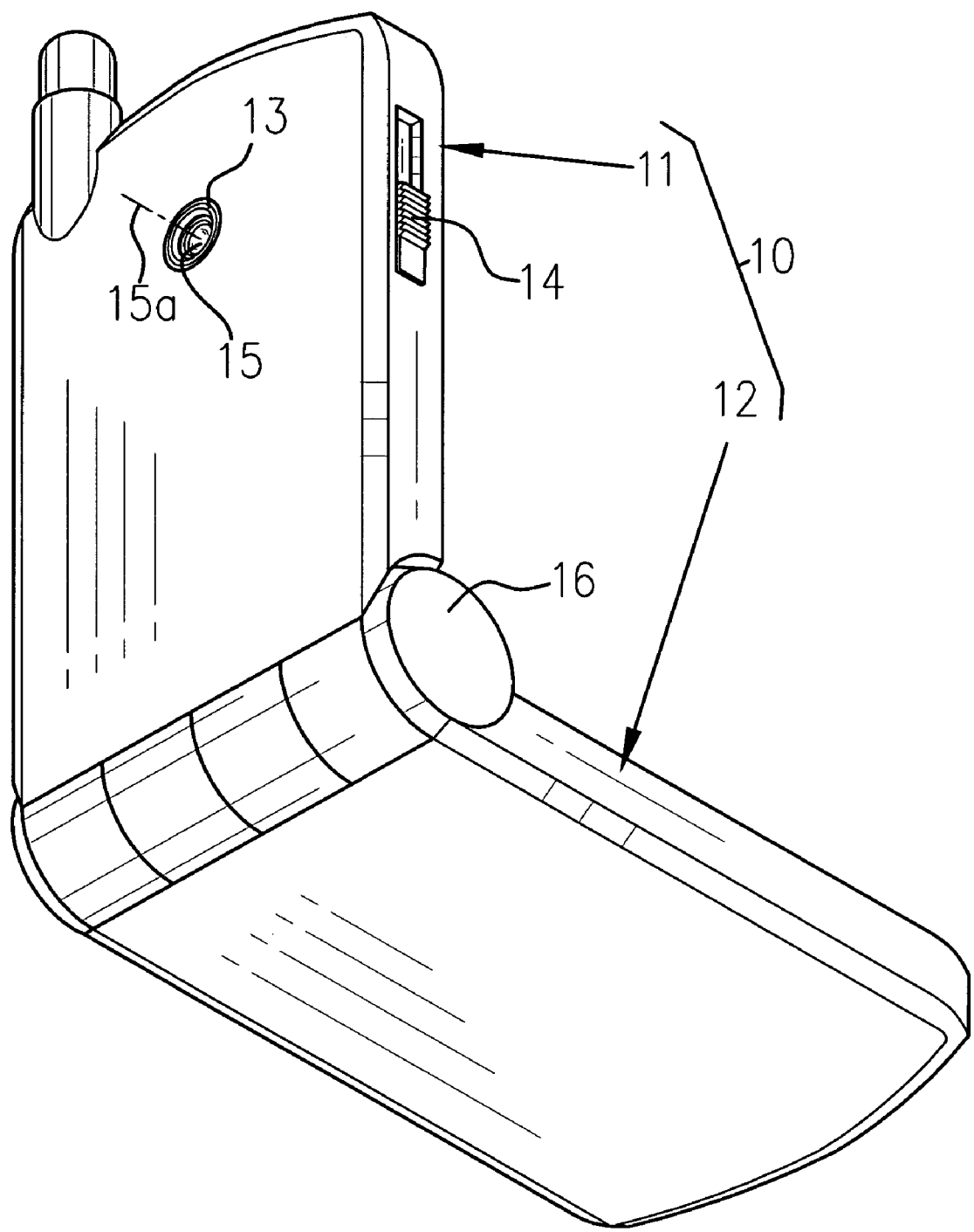
FIG. 8 is a perspective view illustrating a conventional mobile phone.
Figure 9:
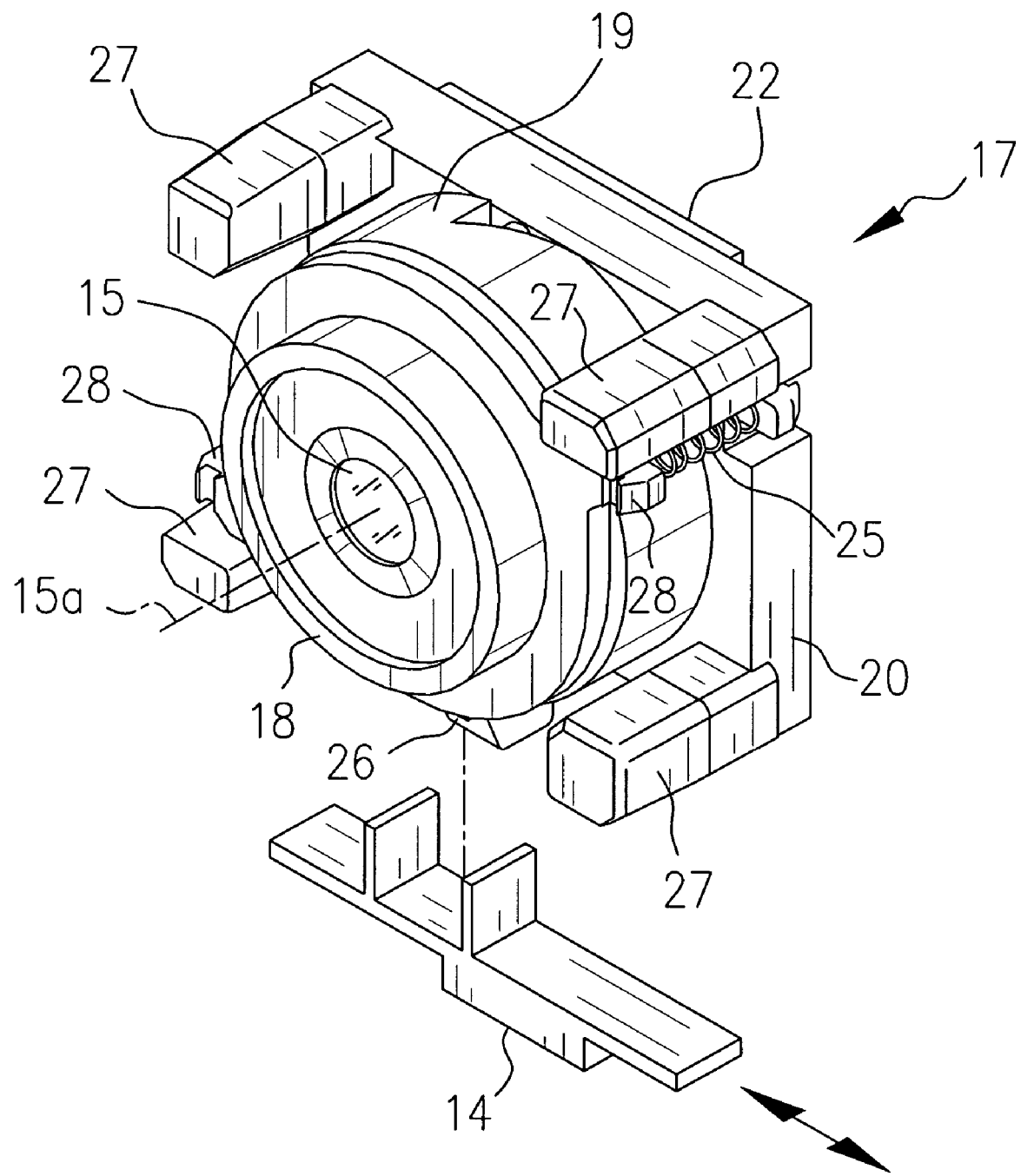
FIG. 9 is a perspective view illustrating a conventional lens device.
Figure 10:
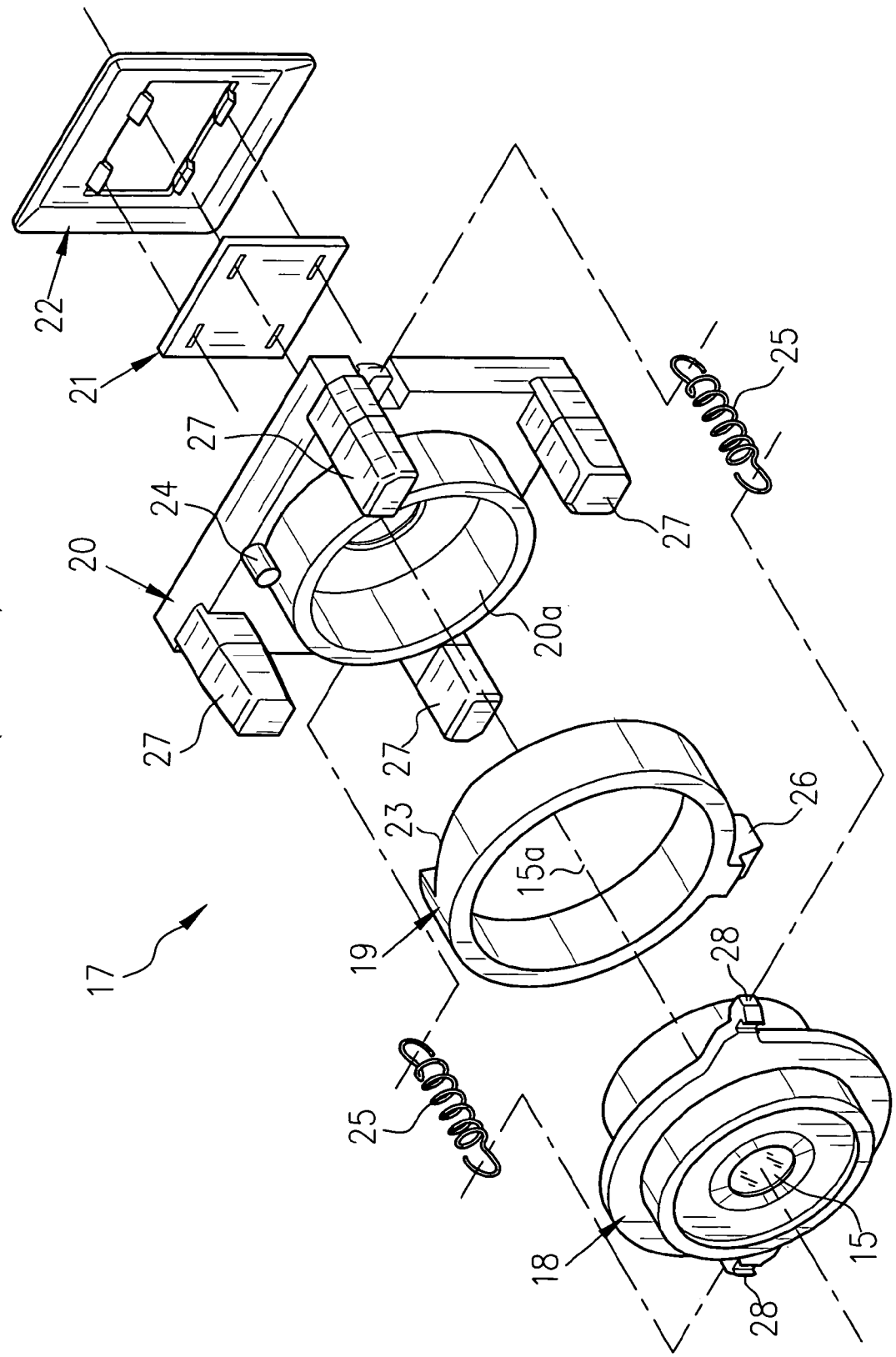
FIG. 10 is an exploded perspective view illustrating the conventional lens device.

As shown in FIG. 4, the each cam 50 is formed between the cutouts 49. The cam 50 is constituted of a first cam surface 56 for positioning the lens holding frame 32 to the ordinary photographing position, and a second cam surface 57 for positioning the lens holding frame 32 to the close-up photographing position. The first cam surface 56 and the second cam surface 57 are connected by a slope for guiding the cam projection 45 smoothly. The second cam surface 57 has a lower height than the first cam surface 56. When the cam projection 45 contacts the second cam surface 57 from the first cam surface 56 by rotation of the cam ring 31, the fixed focal length lens 38 is set at the close-up photographing position which is ahead of the ordinary photographing position in the optical axis 38a.

After the lens device 30 is installed in the mobile phone, the cam ring 31 is rotated within the range for moving the lens holding frame 32 between the ordinary photographing position and the close-up photographing position, because moving of the slide lever of the mobile phone is regulated by a slot. However, before installing the lens device 30 in the mobile phone, if the cam ring 31 is overrotated, the cam ring 31 is positioned at the attaching and detaching position again because there are the three attaching and detaching positions along the circumference direction. In this case, the cam ring 31 may come away from the fixed barrel 40 by the biasing of the biasing ring 34.

By considering the above problem, in this embodiment, recessed portions 60 recessed toward the objective side from the first and second cam surfaces 56, 57 along the direction of the optical axis 38a are formed between the cutout 49 and the cam 50. Walls 61 projecting rearward longer than the first and second cam surfaces 56, 57 are formed between the recessed portions 60 and the cutouts 49. And a surface of the wall 61, which is adjacent to the recessed portion 60 and parallel with the optical axis 38a, is formed as a stopper surface 61a. Accordingly, when the cam ring 31 is improperly overrotated in assembling, the cam ring 31 is not reached to the attaching and detaching position because the rotation of the cam ring 31 is regulated by the cam projection 45 to contact the stopper surface 61a. If there is a need to detach the cam ring 31, the lens holding frame 32 is pushed to the position where the cam projection 45 overreaches the wall 61, provided in the cam ring, against the biasing of the biasing ring 34, and the cam ring 31 is rotated with the lens holding frame pushed. Therefore, the cam ring 31 can be set at the attaching and detaching position where the front regulating member 42 faces the cutout 49.

Now assembling the above construction is briefly explained. The biasing ring 34 and the spacer ring 33 are inserted onto the outer periphery 40b in order such that the positions of the openings 52, 53 correspond to the position of the rear regulating member 43. After that, the lens holding frame 32 is inserted into the fixed barrel 40 such that the position of the guide projection 44 corresponds to the position of the guide opening 41. Accordingly, the lens holding frame 32 becomes slidable along the direction of the optical axis 38a because the projection 44 is engaged with the guide opening 41. Only the cam projection 45, provided on the guide projection 44, is protruded from the outer periphery 40b.

The cam ring 31 is attached after attachment of the lens holding frame 32. The cam ring 31 is fitted on the outer periphery 40b after the cutout 49 corresponds to the front regulating member 42.

When the cam ring 31 is inserted onto the fixed barrel 40, the relation between the cam ring 31 and the fixed barrel 40 becomes a state shown in FIG. 5A from the state shown in FIG. 4. That is, the front regulating member 42 is in front of the cam ring 31 by passing through the cutout 49. And the inserting of the cam ring 31 is regulated by that the rear end of the sleeve 47 contacts to the rear regulating member 43. At this stage, the rear end of each wall 61 contacts and pushes the each cam projection 45 rearward along the optical axis 38a against the biasing of the biasing ring 34. When the cam ring 31 is rotated upward in FIG. 5A, the cam projection 45 enters the cam 50 by overreaching the wall 61 as shown in FIG. 5B.

In FIG. 5B, the cam ring 31 is at the ordinary photographing position where the cam projection 45 contacts the first cam surface 56. And in FIG. 5C, the cam ring 31 is at the close-up photographing position where the cam projection 45 contacts the second cam surface 57. When the slide lever of the mobile phone is operated, the cam ring 31 is rotated via the projection 48. A range between these two positions is a range for photographing L1, within which the cam ring 31 is rotated to switch the photographing state. When the cam ring 31 is rotated downward beyond the range for photographing L1 as shown in FIG. 6A, the cam projection 45 contacts the stopper surface 61a, and when the cam ring 31 is rotated upward beyond the range for photographing L1 as shown in FIG. 6B, the cam projection 45 contacts the other stopper surface 61a. The cam ring 31 cannot come away from the fixed barrel 40, because the rotation of the cam ring 31 beyond the range for photographing L1 is prevented.

In the above embodiment, the lens holding frame 32 can be set at two positions, the ordinary photographing position and the close-up photographing position. However, the present invention is not limited to this embodiment, the lens holding frame 32 may be set at three or more positions, for example a telephotographing position, a wide-angle photographing position, and close-up photographing position. Also, the cam surface may have a step shape to realize step focusing. Further, the cam surface may be a continuous inclined plane.

In the above embodiment, the stopper surface of the wall 61 perpendicular to the cam 50 is used for preventing that the cam ring 31 comes away. However, because the stopper surface 61a is formed on the surface connecting the cam 50, the range of the cam 50 becomes narrow. Accordingly, there may be caused inconvenience such that the cam projection 45 cannot move smoothly by the steep slope between the cam surfaces, and that more than two cam surfaces which determine lens positions are difficult to be formed.

In consideration of this problem, as shown in FIG. 7, there may be a construction that one of the stopper surfaces 61a provided in the circumference direction with respect to the cam 50 is omitted, and instead of it, a stopper projection 80 projecting forward to the objective side from the front end of the cam ring 31 is provided to contact the front regulating member 42 for stopping the upward rotation of the cam ring 31. According to the construction, when the cam ring 31 is rotated in one direction, the projection 80 stated above contacts to the front regulating member 42 to prevent that the rotation of the cam ring 31 reaches to the attaching and detaching position, and when the cam ring 31 is rotated in the other direction, the cam projection 45 contacts the stopper surface 61a to stop the rotation of the cam ring 31. Therefore, the cam ring 31 cannot be rotated to the attaching and detaching position where the front regulating member 42 faces the cutout 49.

Note that there may be a construction that all of the stopper surfaces 61a are omitted and the projections 80 are provided on both sides of the cutout 49. In this case, the cam ring 31 can be rotated to the attaching and detaching position by that the cam ring 31 is pushed rearward to the position where the projection 80 overreaches the front regulating member 42, and then the cam ring 31 is rotated while being pushed rearward.

In the above embodiment, the front and rear regulating members 42, 43 are used for positioning the cam ring 31. However, the present invention is not limited to this embodiment. For example, inward projections projected radially inward from inner circumference of the cam ring 31, grooves extended in the circumference direction on the outer periphery 40b of the fixed barrel 40, and the cutout for allowing the projections to get into the grooves, may be provided such that the inward projections are guided along the grooves.

Although the above embodiment of the lens device is for being built in the mobile phone, the present invention can be applied to the lens device for a photographic camera or an electronic still camera, for example. In addition, although the present invention is not limited to apply to the device for moving the taking lens, the present invention can be applied also to a lens device for moving a lens for a view finder.

What is claimed is:

1. A lens device including:
   a lens holding frame for holding a lens;
   plural cam projections projecting from an outer periphery of said lens holding frame;
   a fixed barrel for containing said lens holding frame movably in a direction of an optical axis of said lens;
   a cam ring rotatably held on outer periphery of said fixed barrel;
   plural cams provided on said cam ring to contact respective ones of said plural cam projections for moving said lens holding frame in the direction of said optical axis; and
   a biasing member provided around said outer periphery of said fixed barrel for biasing each of said plural cam projections toward a respective cam.

2. A lens device according to claim 1, further including:
   plural cutouts formed on inner surface of said cam ring and extending along said optical axis direction;
   plural rear regulating members formed on rear side of said outer periphery of said fixed barrel;
   plural front regulating members formed on front side of said outer periphery of said fixed barrel, each of the front regulating members passing through a respective one of said cutouts when said cam ring is inserted onto said fixed barrel, such that said cam ring is positioned between said front regulating members and said rear regulating members by rotating said cam ring so that movement of said cam ring in said optical axis direction is regulated; and
   a rotation regulating member provided in said cam ring to limit rotation range of said cam ring such that said cutouts do not face said front regulating members.

3. A lens device according to claim 2, wherein each of the plural cams is formed between two adjacent cutouts.

4. A lens device according to claim 3, wherein said front regulating members and said rear regulating members are alternatively provided around said outer periphery of said fixed barrel such that these members are not overlapped in said optical axis direction.

5. A lens device according to claim 3, further including:
   plural guide openings that are cut out linearly in said optical axis direction from the front end of said fixed barrel, wherein each of the cam projections slidably fits in each of said guide openings and projects from each of said guide openings.

6. A lens device according to claim 5, wherein said rotation regulating member is a wall formed at both ends along a circumferential direction of a cam, said wall contacting said cam projection from said circumferential direction to stop rotation of said cam ring.

7. A lens device according to claim 5, wherein said rotation regulating member is constituted of two surfaces, one surface being a wall formed at one end in a circumferential direction of a cam ring, and the other surface being a stopper projection that projects forward along said optical axis direction from the front end of said cam ring toward the front side, said stopper projection contacting a front regulating member when said cam ring is rotated in one direction, and said wall limiting the amount of rotation when said cam ring is rotated in the other direction.

8. A lens device according to claim 5, wherein said cam ring having a first cam surface for positioning said lens holding frame at a first position along the optical axis direction and a second cam surface for positioning said lens holding frame at a second position along the optical axis direction.

9. A lens device according to claim 5, wherein said lens holding frame includes plural guide projections slidably engaged with said guide openings, said plural cam projections projecting from a rear end of said guide projections, and said guide projections having a height so as not to project from said outer periphery of said fixed barrel.

10. A lens device according to claim 5, wherein said cam ring has an L-shaped cross section which is constituted of a ring rotatably engaging with said fixed barrel and a sleeve extending rearward from said ring.

11. A lens device according to claim 10, wherein each cam is formed on said ring, and said cam projections are positioned between said sleeve and said outer periphery of said fixed barrel.

12. A lens device according to claim 11, wherein said biasing member includes:
   a biasing ring being resiliently deformable and having protruding portion protruding in said optical axis direction; and
   a spacer ring arranged between said biasing ring and said cam projections to contact said protruding portion and said cam projections.

13. A lens device according to claim 12, wherein said fixed barrel is integrated with a flange which is in form of a plate.

14. A lens device according to claim 13, wherein said biasing ring and said spacer ring are piled and positioned in front of said flange.

15. A lens device according to claim 5, wherein said rotation regulating member is constituted by two stopper surfaces, one at each end in a circumferential direction of a cam ring.

* * * * *